United States Patent [19]

Kussy et al.

[11] 4,207,602
[45] Jun. 10, 1980

[54] PROTECTOR MEANS FOR ELECTRIC MOTOR

[75] Inventors: Frank W. Kussy, Randallstown; John L. Haydu, Towson; G. Erich Heberlein, Jr., Sykesville, all of Md.

[73] Assignee: Gould Inc., Rolling Meadows, Ill.

[21] Appl. No.: 955,887

[22] Filed: Oct. 30, 1978

[51] Int. Cl.² .............................................. H02H 7/08
[52] U.S. Cl. ........................................ 361/24; 361/25; 361/26; 361/32; 318/473
[58] Field of Search .................. 361/24, 25, 26, 27, 361/32, 31, 105, 103, 106, 37, 23; 318/471, 473, 474, 783, 782

[56] References Cited

U.S. PATENT DOCUMENTS

| | | | |
|---|---|---|---|
| 2,304,599 | 12/1942 | Rigby | 361/32 X |
| 2,707,763 | 5/1955 | Kurtz | 361/32 X |
| 3,370,201 | 2/1968 | Ward | 361/26 |
| 3,916,257 | 10/1975 | Harper, Jr. | 361/32 |

*Primary Examiner*—Patrick R. Salce

*Attorney, Agent, or Firm*—Ostrolenk, Faber, Gerb & Soffen

[57] ABSTRACT

A three phase motor is constructed with each of the three phase windings thereof split in half so that the motor may be selectively connected for energization from either a relatively high or relatively low source. Motor protectors are provided in the form of a three pole automatic resetting overload relay means and two thermostatic switches. The heaters for the individual poles of the overload relay means are connected in series with a half section of the individual phase windings and do not have to be changed when either high or low voltage energization is selected for the motor. The thermostatic switches are embedded in two of the other three winding sections but electrically insulated from the motor winding. The control contact means of the overload relay means and the thermostatic switches are connected in series with the energizing coil of the electromagnet for the contact through which the motor is connected to its energizing source.

7 Claims, 2 Drawing Figures

PROTECTOR MEANS FOR ELECTRIC MOTOR

This invention relates to the protection of electric motors in general and more particularly relates to the protection of relatively heavy duty motors under repeated close interval starting conditions.

Relatively heavy duty motors, say in excess of seven and one half horse power, when used for driving compressors of air conditioning or refrigeration equipment are often subjected to successive starting operations which are separated by relatively short time intervals. This permits a dangerous condition to arise in that the motor does not have sufficient cooling time between successive starts so that motor temperature may be completely unrelated to the temperatures of the heaters for the overload relay. That is, as motor ratings increase the motor radiating surfaces do not increase proportionately so that cooling requires more time as motor rating increases. Further, at best, motor cooling requires much more time than that required for cooling of the relatively low mass heaters for the overloaded relays.

When a cold motor is started under blocked rotor or excessive overload conditions the overload relays will respond quickly enough to protect the motor against damage. With the motor energizing circuit interrupted, both the motor and the overload relays begin to cool but the overload relays cool much more quickly than the motor cools. When overload relay temperature drops to a predetermined level, the overload relays will reset automatically and the motor will be energized for a second time even though it may not have cooled to a safe temperature. If the motor remains in the blocked position, motor temperature for each successive start rises until the motor sustains permanent damage.

For motors of lower ratings protection against overheating is often obtained by providing built-in thermal protectors which act directly to open contacts in the energizing circuit responsive to detecting an over temperature condition in the motor. However, these thermal protectors are not capable of interrupting the currents drawn by relatively large motors, nor are they capable of providing the overload protection characteristics obtained by utilizing overload relays.

In order to overcome the aforesaid difficulties of the prior art, the instant invention utilizes a combination of overload relays and thermostatic switches to protect a three phase motor constructed for wye connection to either a low or high voltage source, typically 230 and 460 volts, respectively. This is accomplished without the necessity of changing the overload relay heaters or the thermostat switches. This is accomplished by connecting one half of each phase winding in a series combination with an overload relay heater and connecting this combination either in series or in parallel with the other half of the winding for this particular phase depending upon the energizing voltage. Two of the three half-windings which are not permanently connected in series with an overload relay heater are associated with temperature sensing devices which operate normally closed switches in series with the normally closed overload relay contacts in the control circuit for the operating coil for the electromagnetic contactor through which the motor is energized.

For the most part, the overload relays provide protection for running overloads, including single phasing. This protection is independent of motor temperature. However, regardless of overload relay characteristics, when motor temperature reaches a critical value, say 200° C., the thermal protectors sense this condition and act to bring about the deenergization of the motor.

Accordingly, a primary object of the instant invention is to provide a novel protector means for a motor which may be subjected to successive starts within short intervals.

Another object is to provide a protector means of this type for a three phase motor that is wye-connectible for energization by either a high or low voltage source.

Another object is to provide a protector means of this type consisting of overload relays and thermal protectors, and wherein the overload relay heaters are the same whether energization is from high or low voltage sources.

These objects as well as other objects of this invention shall become readily apparent after reading the following description in which.

Figures 1, 2:
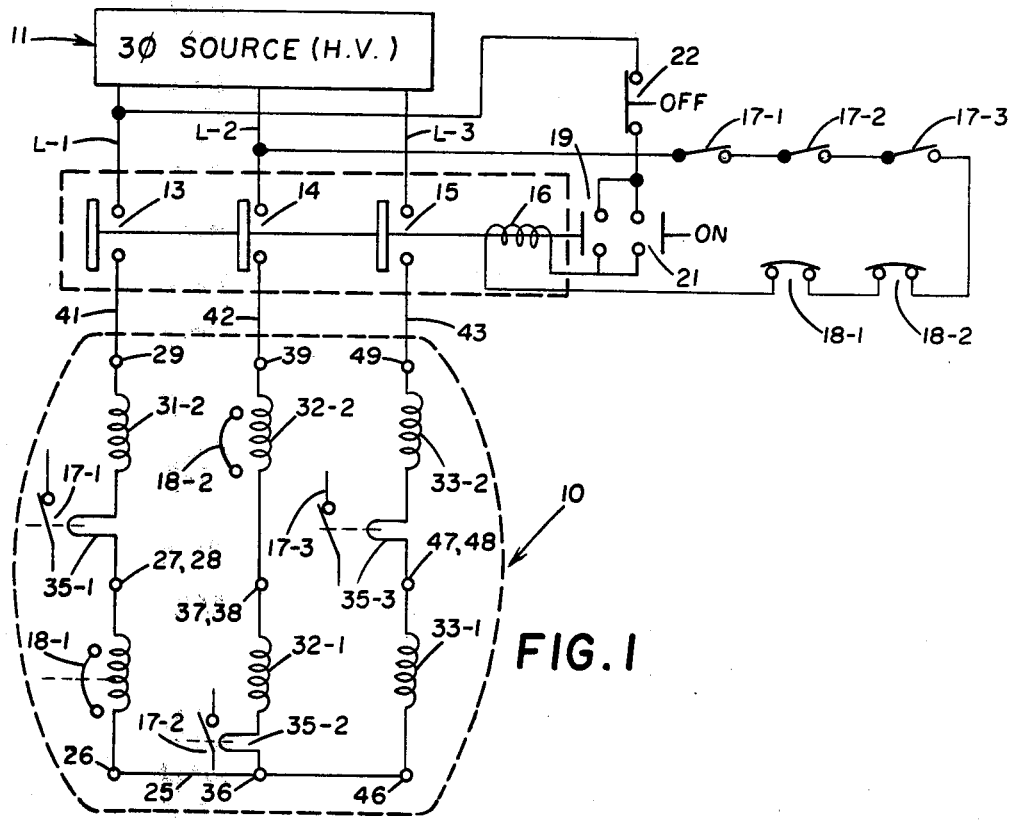
FIG. 1 is an electrical schematic of a motor having protector means constructed in accordance with the instant invention in circuit with a relatively high voltage source.
FIG. 2 is an electrical schematic showing the motor of FIG. 1 connected for energization by the low voltage source.

Now referring to the Figures and more particularly to FIG. 1 which shows three phase motor 10 connected to high voltage energizing source 11 by a conventional electromagnetic contactor 12. The latter includes normally open sets of main contacts 13, 14, 15 which are operated to closed position when electromagnetic operating coil 16 is energized. The control circuit for coil 16 includes the series combination of three overload relay contacts 17-1, 17-2, 17-3 and two thermostatic switches 18-1 and 18-2. One end of this series combination is connected to one end of coil 16 the other end of this series combination is connected directly to energizing line L-2. The other end of coil 16 is connected through normally open On control 21 and normally closed Off control 22 to energizing line L-1 which connects contacts 13 to source 11. The third energizing line L-3 connect contacts 15 to source 11. Normally open holding contacts 19, operated by contactor 12, are connected in parallel with On control 21 in a manner well known to the art.

As will hereinafter be seen, the windings of motor 10 are connected in a wye-array. More particularly, the first phase winding of motor 10 is split into equal sections 31-1 and 31-2. Similarly, the second phase winding of motor 10 is split into equal sections 32-1 and 32-2, and the third phase winding of motor 10 is split into equal sections 33-1 and 33-2. The circuit from the center 25 of the wye to main contacts 13 is a series path extending from terminal 26 at wye center 25, winding section 31-1, terminals 27, 28, overload relay heater 35-1, winding section 31-2, terminal 29 and lead 41. The path from wye center 25 to main contacts 14 consists of terminal 36 connected directly to wye center 25, overload relay heater 35-2, winding section 32-1, terminals 37, 38, winding section 32-2, terminal 39, and lead 42. The path from wye center 25 to main contacts 15 consists of terminal 46 connected directly to wye center 25, winding section 33-1, terminals 47, 48, overload relay heater 35-3, winding section 33-2, terminal 49, and lead 43. In a manner well known to the art, overload relay heaters 35-1, 35-2 and 35-3 are associated with the respective overload relay contacts 17-1, 17-2 and 17-3, for operation of the latter to open circuit condition upon the occurence of predetermined over currents.

Thermostatic switches 18-1 and 18-2 are embedded in or in close proximity to the respective winding sections 31-1 and 32-2 so as to be responsive to the temperatures of these winding sections. Thermostat switches 18-1 and 18-2 are of the type which utilizes a concave bimetallic disc to obtain snap action opening and closing of the switch contacts. Thermostatic switches 18-1 and 18-2 are automatic resetting devices, in that, when the temperature thereof falls below a predetermined level they will close automatically. Similarly, the overload relays which include heaters 35-1, 35-2 and 35-3 are of the automatic resetting type similar to that described in U.S. Pat. No. 3,562,688, issued Feb. 9, 1971 to F. W. Kussy, et al for Quick Trip Overload Relay Heaters.

Now referring more particularly to FIG. 2 which shows motor 10 connected through the main contacts 13, 14, 15 of contactor 12 to low voltage three phase source 51. The reference numerals utilized in the description of FIG. 1 will be used to identify these same elements in FIG. 2. The center 50 of the wye-array in FIG. 2 is connected to main contacts 13 by lead 43 through the parallel combination of winding section 31-1 in parallel with the series combination of overload relay heater 35-1 and winding section 31-2, is connected through lead 41 to main contacts 14 by winding section 32-2 in parallel with the series combination of overload relay heater 35-2 and winding section 32-1, and is connected through lead 42 to main contacts 15 by winding section 33-1 in parallel with the series combination of overload relay heater 35-3 and winding section 33-2.

Thus, it is seen that the protector means for motor 10 is so constructed that the same thermostatic switches 18-1 and 18-2 and the same overload relay heaters 35-1, 35-2 and 35-3 are utilized for operation of motor 10 from both the high voltage three phase source 11, typically 460 volts, and the low voltage three phase source 51, typically 230 volts.

The utilization of two thermostatic switches 18-1 and 18-2 will provide protection for motor 10 in three phase and single phase operation. That is, in three phase operation the sum of the three line currents are zero so that by sensing the current in two phases, any change in the third phase will also be sensed by the two thermostatic switches. When single phase operation occurs, two phase windings are in circuit so that at least one of the thermostatic switches will be effective to sense overheating resulting from the single phase current.

A substantial measure of the protection afforded by the protector means of FIG. 1 may be obtained by eliminating the thermostatic switches and by delaying cooling of the overload relay heaters to a rate comparable to the cooling rate for the motor. The latter may be achieved by placing the overload relays inside the motor housing or by placing the relays in a well insulated housing, such as a housing of thick or foamed plastic.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A three phase motor and protector means therefor; said motor including first, second and third phase windings each comprising a first and a second section, said sections of said phase windings being connectible in a first wye-circuit array for energizing said motor from a relatively low voltage source and also being connectible in a second wye-circuit array for energizing said motor from a relatively high voltage source having approximately twice the voltage of said low voltage source;

said protector means including first, second and third overload relay heaters connected in electrical series with the respective said second section of said first phase winding, said first section of said second phase winding and said second section of said third phase winding;

contact means operatively associated with said heaters and being connected in a control circuit having an operating coil of an electromagnetic contactor through which said motor is energized;

in said first array said first section of first phase winding being connected from the center of the wye to a first energizing phase and being in parallel with the series combination of said first heater and said second section of said first phase winding, said second section of said second phase winding being connected from the center of the wye to a second energizing phase and being in parallel with the series combination of said second heater and said first section of said second phase winding, and said first section of said third phase winding being connected from the center of the wye to a third energizing phase and being in parallel with the series combination of said heater and said second section of said third phase winding;

in said second array said first heater being in series with said first and second sections of said first phase winding between the center of the wye and a first energizing phase, said second heater being in series with said first and second sections of said second phase winding between the center of the wye and a second energizing phase, and said third heater being in series with said first and second sections of said third phase winding between the center of the wye and a third energizing phase;

said protector means also including thermostatic switch means including switching means in circuit with said contact means and temperature sensing means for operating said switch means responsive to temperature of said motor detected by said sensing means.

2. A three phase motor and protector means therefor as set forth in claim 1 in which the temperature sensing means is operatively connected to at least two of said phase windings.

3. A three phase motor and protector means therefor as set forth in claim 2 in which the temperature sensing means is imbedded in and electrically insulated from said phase windings.

4. A three phase motor and protector means therefor as set forth in claim 1 in which said temperature sensing means includes a first and a second portion operatively connected to the first section of said first phase winding and the second section of the second phase winding, respectively.

5. A three phase motor and protector means therefor as set forth in claim 1 in which the heaters are portions of overload relay means constructed for automatic resetting upon cooling of said heaters to a predetermined temperature.

6. A three phase motor and protector means therefor as set forth in claim 5 in which the thermostatic switch means resets automatically when the temperature sensed by said sensing means falls below a predetermined level.

7. A three phase motor and protector means therefor as set forth in claim 1 in which the temperature sensing means includes portions operatively connected only to said first section of said first phase winding and to said second section of said second phase winding.

* * * * *